US011835620B2

(12) United States Patent
Natroshvili

(10) Patent No.: US 11,835,620 B2
(45) Date of Patent: Dec. 5, 2023

(54) MORE RELIABLE CLASSIFICATION OF RADAR DATA FROM DYNAMIC SETTINGS

(71) Applicant: Robert Bosch GmbH, Stuttgat (DE)

(72) Inventor: Koba Natroshvili, Waldbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 542 days.

(21) Appl. No.: 17/119,608

(22) Filed: Dec. 11, 2020

(65) Prior Publication Data

US 2021/0190941 A1 Jun. 24, 2021

(30) Foreign Application Priority Data

Dec. 18, 2019 (DE) .......................... 102019220069.9

(51) Int. Cl.
*G01S 13/91* (2006.01)
*G06N 3/04* (2023.01)
*G09B 9/54* (2006.01)

(52) U.S. Cl.
CPC ................ *G01S 13/91* (2013.01); *G06N 3/04* (2013.01); *G09B 9/54* (2013.01)

(58) Field of Classification Search
CPC .............. G01S 13/91; G06N 3/04; G09B 9/54
USPC ....................................................... 342/456
See application file for complete search history.

(56) References Cited

U.S. PATENT DOCUMENTS

2019/0244108 A1* 8/2019 Meyerson .............. G06N 3/044

FOREIGN PATENT DOCUMENTS

| CN | 110135512 B | * 7/2021 | ........... G06K 9/6228 |
| DE | 102018204494 B3 | 8/2019 | |
| WO | WO-2020211388 A1 | * 10/2020 | ......... G06K 9/00268 |

\* cited by examiner

*Primary Examiner* — Harry K Liu
(74) *Attorney, Agent, or Firm* — NORTON ROSE FULBRIGHT US LLP; Gerard Messina

(57) ABSTRACT

A method for classifying radar data, which have been obtained by registering radar radiation emitted from a transmitter and reflected by at least one object using at least one detector. The method includes: providing radar data, which include observations of a setting recorded at different points in time; ascertaining at least one portion of the radar data, which is rotated and/or scaled in at least one of the observations as compared to at least one other of the observations; ascertaining a fixed point of the rotation and/or scaling; transforming at least one two-dimensional representation of at least one part of the observations into logarithmic polar coordinates using the ascertained fixed point as the origin; and mapping the at least one transformed two-dimensional representation onto at least one class of a predefined classification via at least one classifier, which encompasses a neural network that includes at least one convolution layer.

13 Claims, 4 Drawing Sheets

MORE RELIABLE CLASSIFICATION OF RADAR DATA FROM DYNAMIC SETTINGS

CROSS REFERENCE

The present application claims the benefit under 35 U.S.C. § 119 of German Patent Application No. DE 102019220069.9 filed on Dec. 18, 2019, which is expressly incorporated herein by reference in its entirety.

FIELD

The present invention relates to the classification of radar data, which have been obtained by querying, in particular, dynamic settings.

BACKGROUND INFORMATION

In order for a vehicle to be able to move in road traffic in an at least semi-automated manner, it is necessary to detect the surroundings of the vehicle and to initiate countermeasures if a collision with an object in the surroundings of the vehicle is imminent. The creation of a surroundings representation and localization are also necessary for safe automated driving.

The detection of objects with the aid of radar is not dependent on the lighting conditions and, for example, is possible at greater distances even at night, without the oncoming traffic being blinded by high beam light. The distance and velocity of objects also result directly from the radar data. These pieces of information are important for assessing whether a collision with the objects may result. However, the type of objects involved is not directly identifiable from the radar signals.

This identification is resolved instantaneously by the calculation of attributes from the digital signal processing.

German Patent No. DE 10 2018 204 494 B3 describes classifying radar signals with the aid of neural networks with respect to the objects indicated by the radar signals. A generator with which synthetic training data may be provided in order to remedy a shortage of training data during the training of the networks is also described in this document.

SUMMARY

Within the scope of the present invention, a method is provided for classifying radar data. The radar data have been obtained by registering radar radiation using at least one detector. The radar radiation has been emitted by a transmitter and reflected by at least one object. In this way, the radar radiation has arrived at the detector.

In accordance with an example embodiment of the present invention, radar data are provided, which include observations of a setting (i.e., a scene) recorded at different points in time. The term "observations of a setting" in this case is not to be understood as restrictive in the sense that the observations must be fully congruent with respect to one another. If, for example, the traffic situation directly ahead of a driving vehicle is observed with a radar sensor, then the observable detail of the setting is a different one for each observation, because one part of the setting departs the detection area of the sensor and another part of the setting newly enters into the detection area. It is still the same setting, however.

At least one portion of the radar data is ascertained, which is rotated and/or scaled in at least one of the observations as compared to at least one other of the observations. A fixed point of the rotation and/or of the scaling is ascertained.

With this ascertained fixed point as the origin, at least one two-dimensional representation of at least one portion of the observations is transformed into logarithmic polar coordinates. This at least one transformed two-dimensional representation is mapped by at least one classifier onto at least one class of a predefined classification. This classifier encompasses a neural network including at least one convolution layer.

It has been found that it is possible in this way to improve the reliability of the classification, for example, of the objects contained in the setting and to also simplify the training of the classifier. The cause of this lies in the fact that as a result of the transformation into the logarithmic polar coordinates, changes of the radar data due solely to a change of the relative spatial perspective between the radar sensor and objects may be separated from changes that are due to the presence of different types of objects.

Thus, for example, the larger an object appears in the radar data, the closer it is to the radar sensor. The object is rotated as a function of the angle at which it is observed. During the conventional training of classifiers, the training data include many instances of each object to be identified scaled and/or rotated in this manner and are each annotated ("labeled") as involving precisely this object. Thus, the classifier learns, based on many examples, in which forms the object (for example, a vehicle or a particular traffic sign) may come into the radar data. Due to its ability to generalize, this places the classifier in the position of correctly classifying the object even in further observation situations not covered in the training.

If, however, two-dimensional representations of observations are then transformed into logarithmic polar coordinates, a scaling of the input observation is manifested in the result of the transformation in a shift in one dimension. A rotation of the input observation is manifested in the result of the transformation in a shift in another dimension. The convolution operations that are utilized by classifiers in convolution layers are, however, invariant toward such shifts.

This means that one and the same object at the output of the convolution layer always produces the same result, regardless of by which factor it is scaled or at which angle it is rotated, which is ultimately further processed to form the result of the classification. The ability of the classifier to correctly identify the object in all observation situations is thus no longer tied to the fact that the training data show the object in a multitude of different combinations based on angle and distance of the observation.

Accordingly, fewer training data and less computing time are required for training the classifier in order to achieve a classification of, for example, traffic-relevant objects in traffic situations with a predefined accuracy.

This is advantageous, in particular, with respect to a classification of objects, for example, which, though they occur relatively infrequently in traffic situations, must be strictly noted when they do occur. Training data for classifiers, for example, of traffic signs and of other traffic-relevant objects are typically acquired by a test vehicle driving particular routes or areas and collecting radar data. The number of different combinations based on angle and distance, with which a particular object is represented in the training data is a function of how frequently the object even occurs on the routes traveled or in the areas traveled. Thus, for example, signs that order "stop," "yield right of way" or speed limits occur so frequently in the public traffic area that the training data practically inevitably contain numerous instances of these signs in numerous sizes and at numerous rotation angles. By comparison, unguarded railroad crossings and roads leading to unsecured shorelines occur comparatively infrequently. Thus, the training data inherently contain far fewer instances of the hazard signs that refer to these situations in different combinations and based on size and perspective distortion. Should the safe identification of these hazard signs suffer as a result, the vehicle could at worst crash into the water or be crushed by an oncoming train. With the transformation of the observations into logarithmic polar coordinates neutralizing the influence of rotations and scalings of the objects virtually before the classifier, the minimum number of instances with which each object to be classified must occur in the training data of the classifier for a safe identification, is significantly reduced.

In one particularly advantageous embodiment of the present invention, two-dimensional or three-dimensional spatial distributions of at least two measured variables resulting from the reflected radar radiation are combined in a multi-dimensional tensor. In this case, two or three dimensions of the tensor represent the spatial dimensions of the distributions. A further dimension of the tensor represents the number of available measured variables. In radar measurements, in particular, one and the same coordinate in the three-dimensional space may, for example, be associated with values of a plurality of measured variables. Examples of such measured variables are the intensity of the reflected radar radiation, the radar cross section of objects in the setting as well as a velocity component of objects in the propagation direction of the radar radiation.

The organization of the measured variables in the tensor ensures that the spatial distributions of the measured variables may be transformed into logarithmic polar coordinates independently of one another in the manner described. The influence of the distance and of the spatial orientation between the radar sensor used for the measurements and the observed objects is then neutralized in each individual one of these distributions, as explained above. Accordingly, the classifier has complete freedom in terms of ascertaining the one or multiple correct classes of the predefined classification on the basis of a transformed meaningful measured variable, or also on the basis of a combination of such measured variables. Thus, for example, objects that are similar in shape are distinguished from one another based possibly on their characteristic movement patterns. A public-transit bus has a shape similar to a motorhome, for example, but must be accelerated and decelerated significantly more carefully so that standing passengers do not fall and become injured.

As explained above, the transformation into the logarithmic polar coordinates presupposes the prior ascertainment of a fixed point. There is a freedom of choice in terms of how this ascertainment proceeds in particular. In one particularly advantageous embodiment, the ascertainment of the fixed point encompasses assessing multiple candidate fixed points using a quality function in terms of how well they conform to the observations. The fixed point is selected based on these assessments. In the simplest case, for example, all candidate fixed points of one discrete coordinate grid may be assessed, and one candidate fixed point having the best assessment may then be selected as the fixed point.

A parameterized approach including free parameters may also be established for the candidate fixed points, for example. The free parameters may then be optimized with the aim of the quality function assuming an extremum. A parameterized approach is not tied to one particular discrete coordinate grid, so that the fixed point may be determined with a better accuracy than that it corresponds to the smallest unit of such a coordinate grid. In addition, previous knowledge, for example, may also be introduced into the parameterized approach to the extent in which sub-area of all possible candidate fixed points the fixed point should be reasonably sought.

It is also possible, for example, to feed multiple observations to a trained classifier and/or regressor, which maps these observations onto the fixed point sought. A classifier and/or regressor may therefore be trained to the effect that a particular set of observations relating to a particular setting, may only be consistent with particular fixed points.

In one particularly advantageous embodiment of the present invention, radar data are selected, which have been detected using a detector mounted at or in a vehicle. Classes of the predefined classification then represent traffic signs, other road users, traffic lane boundaries, obstacles and/or other traffic-relevant objects. As explained above, one and the same object in road traffic, in particular, is observed at a very large number of combinations of distance and observation angle and must nevertheless be correctly classified each time. The method in this example embodiment may, in particular, also include the physical recording of the radar data for the purpose of providing, for example.

An activation signal may be generated as a function of the at least one class provided by the classifier, and the vehicle may be activated using this activation signal. For example, the trajectory of the vehicle may be changed by this activation signal in such a way that it no longer intersects the trajectory of another object and thus a collision with this object is avoided.

In one further particularly advantageous embodiment of the present invention, radar data are selected, which have been detected by irradiating an area to be monitored with radar radiation from a stationary transmitter and by measuring the reflected radiation using at least one stationary detector. Classes of the predefined classification then represent persons, animals, vehicles, tools and/or other objects relevant for the safety of the area to be monitored. When monitoring areas as well, objects at multiple different combinations of distance and observation angle are presented to one or multiple stationary radar sensors. This applies, in particular, if radar sensors or other detectors are indeed stationary, but pivotably mounted. One and the same location in the area to be monitored may then be selectively observed by various sensors at various angles. The method in this embodiment may encompass, in particular, also the physical recording of the radar data for the purpose of providing, for example.

An activation signal may be generated as a function of the at least one class provided by the classifier, and a system for monitoring the area may be activated using this activation signal. For example, an alarm physically perceptible in the monitored area, and/or a silent alarm to a location responsible for the safety of the area may be triggered in response to an object identified as a threat to the safety of the monitored area.

As explained above, eliminating the necessity of presenting to a classifier within the scope of its training one and the same object at multiple different combinations of distance and observation angle, simplifies the training significantly and improves the training result. The present invention therefore also relates to a method for training a classifier, which encompasses a neural network including one convolution layer, for use in the above-described method.

In accordance with an example embodiment of the present invention, within the scope of this method, learning radar data are provided with learning observations. Setpoint classes of a predefined classification are provided, which are assigned to each of the learning observations. Each learning observation is assigned those setpoint classes onto which the classifier should ideally map this learning observation in its fully trained state.

At least one two-dimensional representation each of at least one part of each learning observation is transformed into logarithmic polar coordinates, one fixed point being established as the origin. This fixed point is selected as a point around which observations in the intended operation of the classifier probably appear rotated and/or scaled as compared to the learning observations.

The transformed two-dimensional representations are mapped by the classifier onto one or multiple classes of the predefined classification. Parameters that characterize the behavior of the classifier are optimized with the aim that the classes provided by the classifier to the transformed representations of the learning observations coincide as much as possible with the setpoint classes according to a predefined cost function.

The transformation of the representations of the learning observations into logarithmic polar coordinates has the effect, similar to that described above, that during the subsequent use of the classifier, observations, which are rotated and/or scaled around the selected fixed point as compared to the learning observations, produce the same results at the output of the convolution layer as the learning observations. Such scalings and rotations thus do not influence the result provided by the classifier. As a result of the transformation with the correct choice of the fixed point, the classifier is thus virtually "prepared" against scalings and/or rotations occurring in the radar data during subsequent use.

The methods may, in particular, be wholly or partially computer-implemented. The present invention therefore also relates to a computer program including machine-readable instructions which, when they are executed on one or on multiple computers, prompt the computer or computers to carry out one of the described methods. In this context, control units for vehicles and embedded systems for technical devices, which are also capable of executing machine-readable instructions, are also to be considered as computers.

Similarly, the present invention also relates to a machine-readable data medium and/or to a download product including the computer program. A download product is a digital product transmittable via a data network, i.e., downloadable by a user of the data network, which may, for example, be offered for sale in an online shop for immediate download.

Furthermore, a computer including a computer program may be equipped with the machine-readable data medium or with the download product.

BRIEF DESCRIPTION OF THE DRAWINGS

Further measures improving the present invention are described in greater detail below together with the description of the preferred exemplary embodiments of the present invention with reference to the figures.

DETAILED DESCRIPTION OF EXAMPLE EMBODIMENTS

Figure 1:
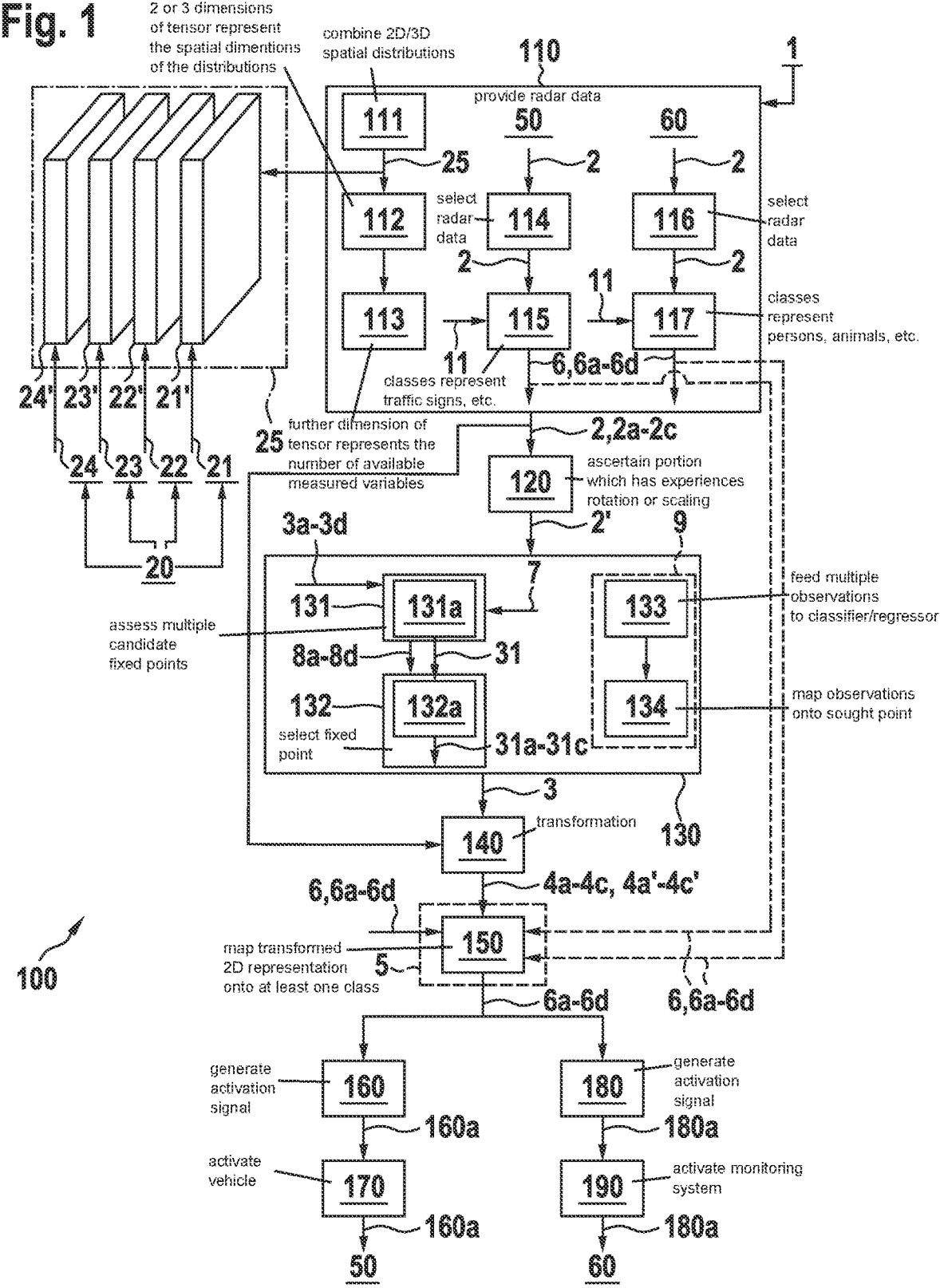
FIG. 1 shows one exemplary embodiment of method 100 for classifying radar data 2, in accordance with the present invention.

FIG. 1 is a schematic flowchart of one exemplary embodiment of method 100 for classifying radar data 2.

In step 110, radar data 2 are provided, which contain observations 2a through 2c of a setting 1 recorded at different points in time. In step 120, at least one portion 2' of radar data 2 is ascertained which, as compared to observations 2a through 2c among one another, has experienced a rotation and/or scaling. A fixed point 3 of this rotation and/or scaling is ascertained in step 130.

In step 140, this fixed point 3 is utilized as an origin in order to transform at least one two-dimensional representation 4a through 4c of at least one part of observations 2a through 2c into logarithmic polar coordinates. The at least one transformed representation 4a through 4c is mapped with a classifier 5, which encompasses a neural network including at least one convolution layer, onto at least one class 6a through 6d of a predefined classification 6.

Two examples are specified in FIG. 1, as to how classes 6a through 6d ascertained in this manner may be used in technical applications. In step 160, an activation signal 160a is generated as a function of class 6a through 6d provided by classifier 5, and a vehicle 50 is activated in step 170 using this activation signal 160a. In step 180, an activation signal 180a is generated as a function of class 6a through 6d provided by classifier 5, and a system 60 for monitoring an area is activated in step 190 using activation signal 180a.

Different embodiments are specified by way of example within box 110, as to how radar data 2 may be provided with observations 2a through 2c. Radar data 2 are formed, in general, by registering radar radiation 20 emitted from a transmitter and reflected by at least one object using at least one detector.

According to block 111, two-dimensional or three-dimensional spatial distributions 21' through 24' of at least two measured variables 21 through 24 resulting from reflected radar radiation 20 may be combined in one multi-dimensional tensor 25. According to block 112, two or three dimensions of this tensor 25 represent the spatial dimensions of distributions 21' through 24'. In the example shown in FIG. 1, distributions 21' through 24' are two-dimensional. According to block 113, a further dimension of tensor 25 represents the number of available measured variables 21 through 24. There are four measured variables 21 through 24 in the example shown in FIG. 1.

According to block 114, radar data 2 may be selected, which have been detected with a detector mounted at or in a vehicle 50. According to block 115, classes 6a through 6d of predefined classification 6 may then represent traffic signs, other road users, traffic lane boundaries, obstacles and/or other traffic-relevant objects 11.

According to block 116, radar data 2 may be selected, which have been detected by irradiating an area to be monitored with radar radiation 20 from a stationary transmitter and by measuring reflected radiation 20 using at least one stationary detector of a system 60 for monitoring the area. According to block 117, classes 6a through 6d of the predefined classification 6 may then represent persons, animals, vehicles, tools and/or other objects 11 relevant for the safety of the area to be monitored.

Different embodiments are specified by way of example within box 130 as to how fixed point 3 required for transformation 140 may be ascertained.

According to block 131, multiple candidate fixed points 3a through 3d may be assessed using a quality function 7 in terms of how well they conform to observations 2a through 2c. Fixed point 3 may then be selected according to block 132 based on these assessments 8a through 8d.

According to block 131a, a parametric approach 31 including free parameters 31a through 31c may, in particular, be established for candidate fixed points 3a through 3d, for example. Free parameters 31a through 31c may then be optimized in block 132a with the aim of quality function 7 assuming an extremum.

According to block 133, multiple observations 2a through 2c may be fed to a classifier and/or regressor 9. According to block 134, this classifier and/or regressor 9 maps/map observations 2a through 2c onto sought fixed point 3.

Figure 2:
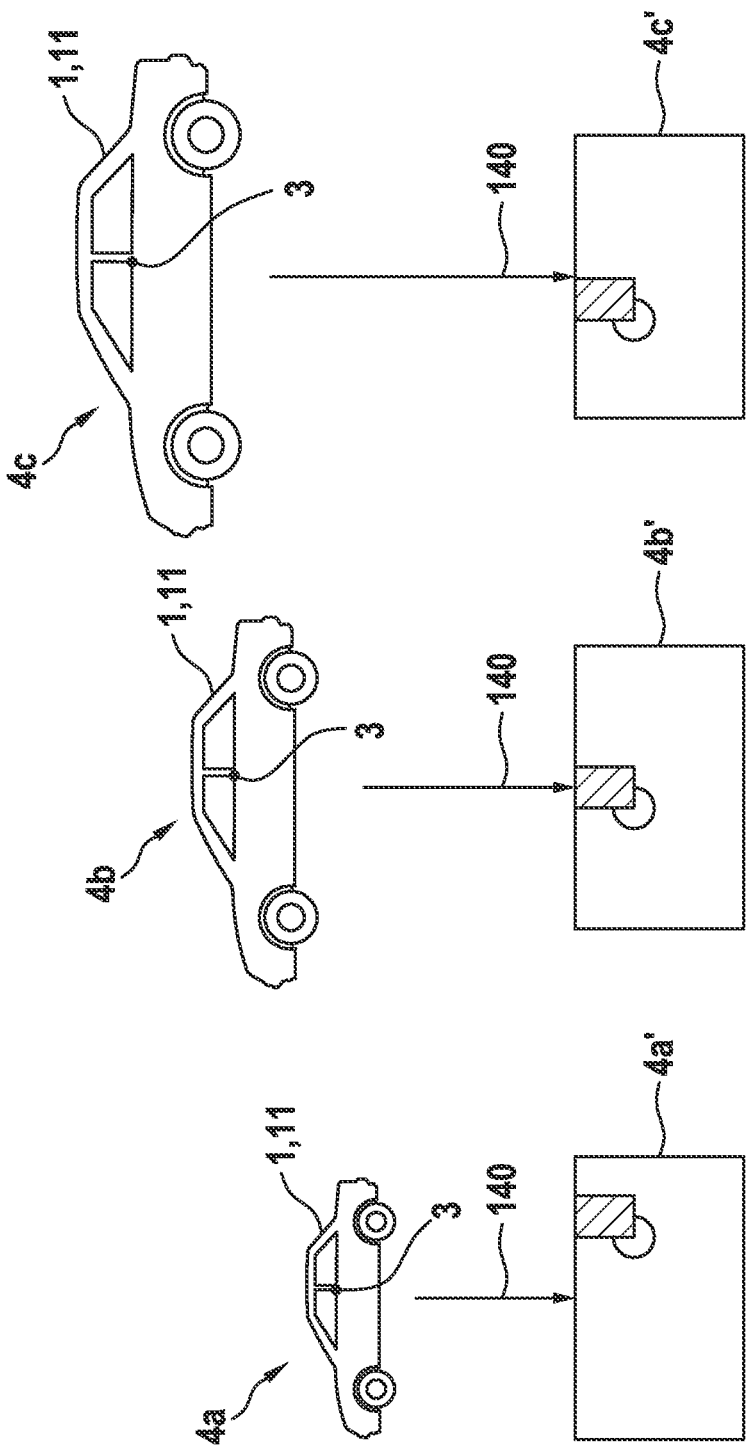
FIG. 2 shows the effect of a scaling in representations 4a through 4c of observations 2a through 2c on the transformed representations 4a' through 4c', in accordance with the present invention.

FIG. 2 shows three two-dimensional representations 4a through 4c of one and the same object 11 in a setting 1. Representations 4a through 4c belong to observations 2a through 2c, which have been recorded at different points in time. All three representations 4a through 4c show the same vehicle as object 11, but in different sizes. Object 11 may, for example, appear larger from one observation 2a through 2c to the next if the distance to object 11 is successively reduced.

In FIG. 2, it is delineated in a stylized manner that the change of size in representations 4a through 4c impacts transformed representations 4a' through 4c' obtained in each case by transformation 140 in the form of a translation from right to left.

Figure 3:
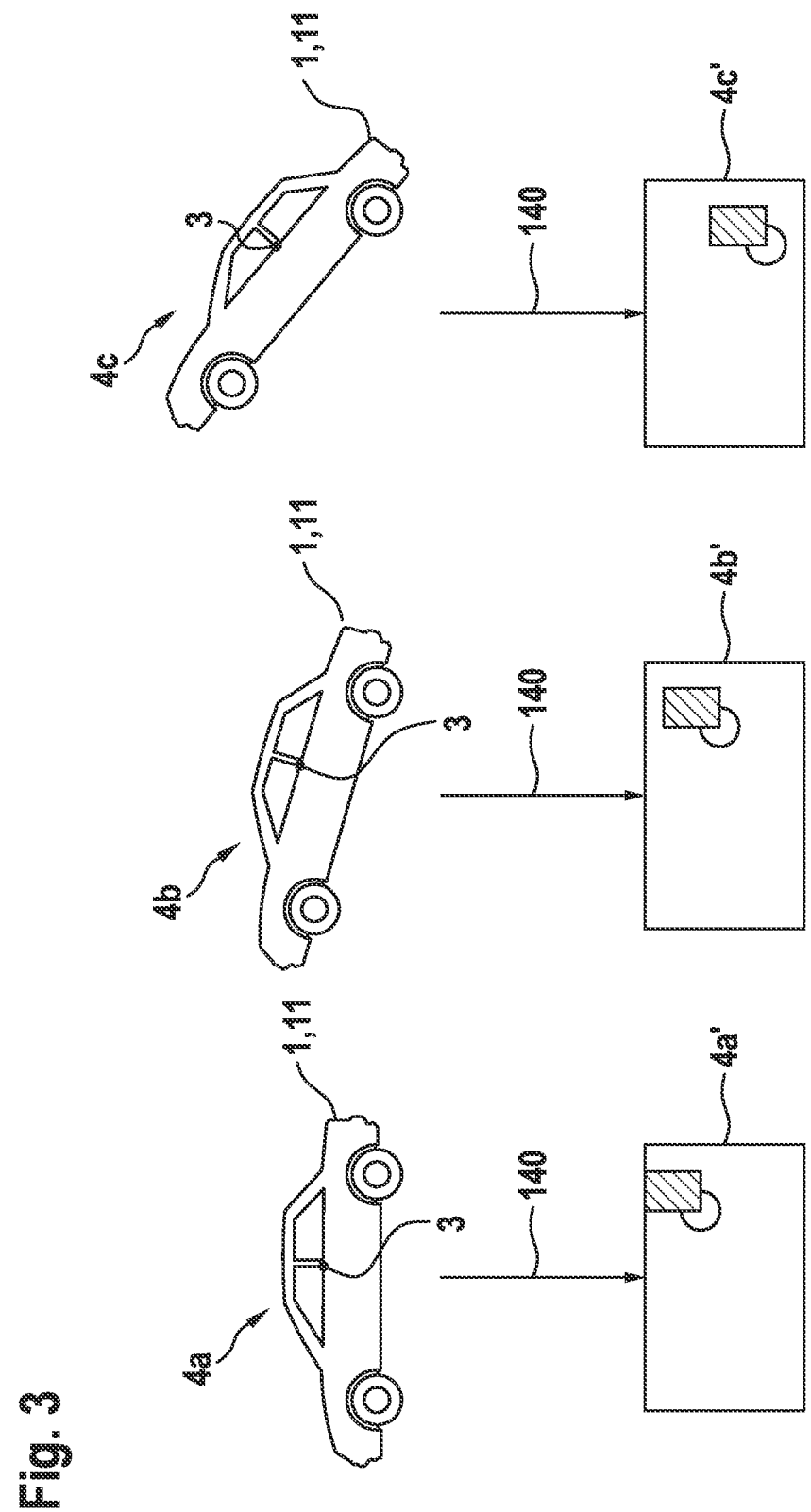
FIG. 3 shows the effect of a rotation in representations 4a through 4c of observations 2a through 2c on the transformed representations 4a' through 4c', in accordance with the present invention.

FIG. 3 shows three further representations 4a through 4c of identical object 11 in setting 1. In contrast to FIG. 2, representations 4a through 4c show object 11 here in each case in the same size but rotated at different angles. Object 11 may, for example, appear rotated from one observation 2a through 2c to the next if the relative orientation of the observer to object 11 successively changes.

In FIG. 3, it is delineated in a stylized manner that the rotation in representations 4a through 4c impacts transformed representations 4a' through 4c' obtained in each case by transformation 140 in the form of a translation from top to bottom.

Figure 4:
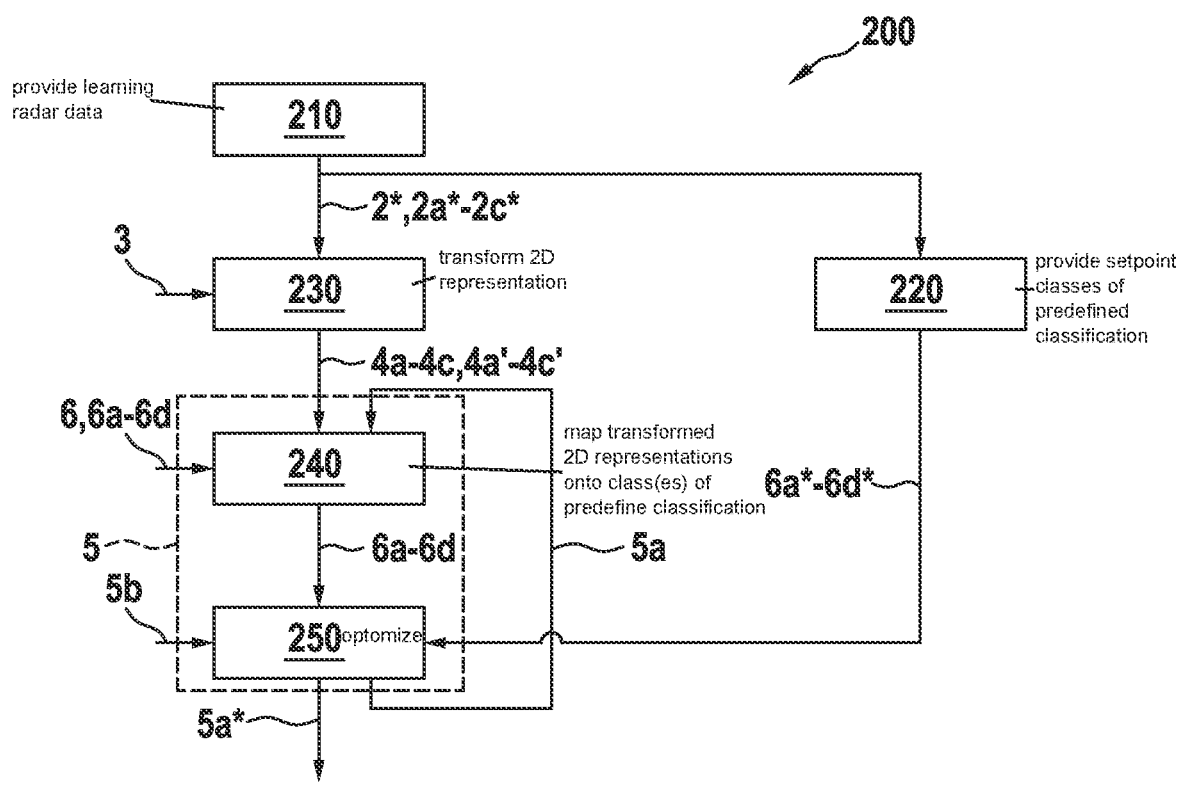
FIG. 4 shows one exemplary embodiment of method 200 for training classifier 5, in accordance with the present invention.

FIG. 4 shows one exemplary embodiment of method 200 for training classifier 5. In step 210 of this method 200, learning radar data 2* are provided with learning observations 2a* through 2c*. In step 230, at least one two-dimensional representation 4a through 4c each of at least one part of every learning observation 2a* through 2c* is transformed into logarithmic polar coordinates. In this case, a fixed point 3 is used as the origin, around which observations 2a through 2c in the intended area of classifier 5 probably appear rotated and/or scaled as compared to learning observations 2a* through 2c*. As explained above, this has the effect that classifier 5 is "immunized" against rotations and/or scalings around precisely this fixed point 3.

In step 240, transformed two-dimensional representations 4a through 4c are mapped by classifier 5 onto one or multiple classes 6a through 6d of predefined classification 6. Parameters 5a, which characterize the behavior of classifier 5, are optimized in step 250 with the aim that the classes provided by classifier 5 to transformed representations 4a' through 4c' of learning observations 2a through 2c coincide preferably well with predefined setpoint classes 6a* through 6d* (provided in step 220) according to a predefined cost function 5b.

If the optimization is converged according to a predefined criterion, the result of the training produced are the finished optimized parameters 5a*, which characterize the behavior of classifier 5 in the state usable in method 100.

Example embodiments of the present invention are also set forth in the numbered paragraphs below.

Paragraph 1. A method (100) for classifying radar data (2), which have been obtained by registering radar radiation (20) emitted from a transmitter and reflected by at least one object using at least one detector, including the steps:
  providing (110) radar data (2), which include observations (2a through 2c) of a setting (1) recorded at different points in time;
  ascertaining (120) at least one portion (2') of the radar data (2), which is rotated and/or scaled in at least one of the observations (2a through 2c) as compared to at least one other of the observations (2a through 2c);
  ascertaining (130) a fixed point (3) of the rotation and/or scaling;
  transforming (140) at least one two-dimensional representation (4a through 4c) of at least one part of the observations (2a through 2c) into logarithmic polar coordinates using the ascertained fixed points (3) as the origin;
  mapping (150) the at least one transformed two-dimensional representation (4a' through 4c') onto at least one class (6a through 6d) of a predefined classification (6) via at least one classifier (5), which encompasses a neural network that includes at least one convolution layer.

Paragraph 2. The method (100) as recited in Paragraph 1, wherein two-dimensional or three-dimensional spatial distributions (21' through 24') of at least two measured variables (21 through 24) resulting from the reflected radar radiation (20) are combined (111) in a multi-dimensional tensor (25), two or three dimensions of the tensor (25) representing (112) the spatial dimensions of the distributions (21' through 24') and a further dimension of the tensor (25) representing (113) the number of available measured variables (21 through 24).

Paragraph 3. The method (100) as recited in Paragraph 2, wherein the measured variables (21 through 24) encompass
  the intensity of the reflected radar radiation (20), and/or
  the radar cross section of objects (11) in the setting (1) and/or
  a velocity component of objects (11) in the propagation direction of the radar radiation (20).

Paragraph 4. The method (100) as recited in one of Paragraphs 1 through 3, wherein the ascertainment (130) of the fixed point (3) encompasses assessing (131) multiple candidate fixed points (3a through 3d) using a quality function (7) in terms of how well they conform to the observations (2a through 2c), and selecting (132) the fixed point (3) based on these assessments (8a through 8d).

Paragraph 5. The method (100) as recited in Paragraph 4, wherein a parameterized approach (31) including free parameters (31a through 31c) is established (131a) for the candidate fixed points (3a through 3d), and the free parameters (31a through 31c) being optimized (132a) with the aim of the quality function (7) assuming an extremum.

Paragraph 6. The method (100) as recited in one of Paragraphs 4 through 5, wherein multiple observations (2a through 2c) are fed (133) to a trained classifier and/or regressor (9), which maps (134) these observations (2a through 2c) onto the sought fixed point (3).

Paragraph 7. The method (100) as recited in one of Paragraphs 1 through 6, wherein radar data (2) are selected (114), which have been detected using a detector mounted at or in a vehicle (50), and classes (6a through 6d) of the predefined classification (6) representing (115) traffic signs, other road users, traffic lane boundaries, obstacles and/or other traffic-relevant objects (11).

Paragraph 8. The method (100) as recited in Paragraph 7, wherein an activation signal (160a) is generated (160) as a function of the at least one class (6a through 6d) provided by the classifier (5), and the vehicle (50) being activated (170) using this activation signal (160a).

Paragraph 9. The method (100) as recited in one of Paragraphs 1 through 6, wherein radar data (2) are selected (116), which have been detected by irradiating an area to be monitored with radar radiation (20) from a stationary transmitter and by measuring the reflected radiation (20) using at least one stationary detector, and classes (6a through 6d) of the predefined classification (6) representing (117) persons, animals, vehicles, tools and/or other objects (11) relevant for the safety of the area to be monitored.

Paragraph 10. The method (100) as recited in Paragraph 9, wherein an activation signal (180a) is generated (180) as a function of the at least one class (6a through 6d) provided by the classifier (5), and a system (60) for monitoring the area being activated using this activation signal (180a).

Paragraph 11. A method (200) for training a classifier (5), which encompasses a neural network including at least one convolution layer, for use in the method (100) as recited in one of Paragraphs 1 through 10, including the steps:
providing (210) learning radar data (2*) with learning observations (2a* through 2c*);
providing (220) setpoint classes (6a* through 6d*) of a predefined classification (6), which are assigned to each of the learning observations (2a* through 2c*);
transforming (230) at least one two-dimensional representation (4a through 4c) each of at least one part of each learning observation (2a* through 2c*) into logarithmic polar coordinates including a fixed point (3) as the origin, this fixed point (3) being selected as a point around which observations (2a through 2c) in the intended area of the classifier (5) probably appear rotated and/or scaled as compared to the learning observations (2a* through 2c*);
mapping (240) the transformed two-dimensional representations (4a' through 4c') onto one or multiple classes (6a through 6d) of the predefined classification (6) via the classifier (5);
optimizing (250) parameters (5a), which characterize the behavior of the classifier (5), with the aim that the classes provided by the classifier (5) to the transformed representations (4a' through 4c') of the learning observations (2a through 2c) coincide preferably well with the setpoint classes (6a* through 6d*) according to a predefined cost function (5b).

Paragraph 12. A computer program, containing machine-readable instructions which, when they are executed on one or on multiple computers, prompt the computer(s) to carry out a method (100, 200) as recited in one of Paragraphs 1 through 11.

Paragraph 13. A machine-readable data medium and/or download product including the computer program as recited in Paragraph 12.

Paragraph 14. A computer, equipped with the computer program as recited in Paragraph 12 and/or with the machine-readable data medium and/or download product as recited in Paragraph 13.

What is claimed is:

1. A method for classifying radar data, which have been obtained by registering radar radiation emitted from a transmitter and reflected by at least one object using at least one detector, the method comprising the following steps:
providing radar data, which include observations of a setting recorded at different points in time;
ascertaining at least one portion of the radar data, which is rotated and/or scaled in at least one of the observations as compared to at least one other of the observations;
ascertaining a fixed point of the rotation and/or scaling;
transforming at least one two-dimensional representation of at least one part of the observations into logarithmic polar coordinates using the ascertained fixed point as the origin; and
mapping the at least one transformed two-dimensional representation onto at least one class of a predefined classification via at least one classifier, the at least one classifier encompassing a neural network that includes at least one convolution layer.

2. The method as recited in claim 1, wherein two-dimensional or three-dimensional spatial distributions of at least two measured variables resulting from the reflected radar radiation are combined in a multi-dimensional tensor, two or three dimensions of the tensor representing a spatial dimensions of the distributions and a further dimension of the tensor representing the number of available measured variables.

3. The method as recited in claim 2, wherein the measured variables include:
an intensity of the reflected radar radiation, and/or
a radar cross section of objects in the setting, and/or
a velocity component of the objects in a propagation direction of the radar radiation.

4. The method as recited in claim 1, wherein the ascertainment of the fixed point includes assessing each of multiple candidate fixed points using a quality function in terms of how well it conforms to the observations, and selecting the fixed point based on the assessments.

5. The method as recited in claim 4, wherein a parameterized approach including free parameters is established for the candidate fixed points, and the free parameters are optimized with an aim of the quality function assuming an extremum.

6. The method as recited in claim 4, wherein multiple observations of the observations are fed to a trained classifier and/or regressor, which maps the multiple observations onto the fixed point.

7. The method as recited in claim 1, wherein the radar data are selected, which have been detected using a detector mounted at or in a vehicle, and wherein classes of the predefined classification represent traffic signs, and/or other road users, and/or traffic lane boundaries, and/or obstacles, and/or other traffic-relevant objects.

8. The method as recited in claim 7, further comprising:
generating an activation signal as a function of the at least one class provided by the classifier, and activing the vehicle using the activation signal.

9. The method as recited in claim 1, wherein the radar data are selected, which have been detected by irradiating an area to be monitored with radar radiation from a stationary transmitter and by measuring the reflected radiation using at least one stationary detector, and wherein classes of the predefined classification representing persons, and/or animals, and/or vehicles, and/or tools, and/or other objects relevant for safety of an area to be monitored.

10. The method as recited in claim 9, further comprising:
generating an activation signal as a function of the at least one class provided by the classifier, and activating a system for monitoring the area using the activation signal.

11. A method for training a classifier, the classifier encompasses a neural network including at least one convolution layer, the method comprising the following steps:
providing learning radar data with learning observations;
providing setpoint classes of a predefined classification, which are assigned to each of the learning observations;
transforming at least one two-dimensional representation each of at least one part of each of the learning observations into logarithmic polar coordinates including a fixed point as the origin, the fixed point being selected as a point around which observations in an intended area of the classifier probably appear rotated and/or scaled as compared to the learning observations;
mapping the transformed two-dimensional representations onto one or multiple classes of the predefined classification via the classifier; and
optimizing parameters which characterize a behavior of the classifier, with an aim that the classes provided by the classifier to the transformed representations of the learning observations coincide with the setpoint classes according to a predefined cost function.

12. A non-transitory machine-readable data medium on which is stored a computer program for classifying radar data, which have been obtained by registering radar radiation emitted from a transmitter and reflected by at least one object using at least one detector, the computer program, when executed by one or more computers, causing the one or more computers to perform the following steps:
providing radar data, which include observations of a setting recorded at different points in time;
ascertaining at least one portion of the radar data, which is rotated and/or scaled in at least one of the observations as compared to at least one other of the observations;
ascertaining a fixed point of the rotation and/or scaling;
transforming at least one two-dimensional representation of at least one part of the observations into logarithmic polar coordinates using the ascertained fixed point as the origin; and
mapping the at least one transformed two-dimensional representation onto at least one class of a predefined classification via at least one classifier, the at least one classifier encompassing a neural network that includes at least one convolution layer.

13. A computer configured to classify radar data, which have been obtained by registering radar radiation emitted from a transmitter and reflected by at least one object using at least one detector, the computer configured to:
provide radar data, which include observations of a setting recorded at different points in time;
ascertain at least one portion of the radar data, which is rotated and/or scaled in at least one of the observations as compared to at least one other of the observations;
ascertain a fixed point of the rotation and/or scaling;
transform at least one two-dimensional representation of at least one part of the observations into logarithmic polar coordinates using the ascertained fixed point as the origin; and
map the at least one transformed two-dimensional representation onto at least one class of a predefined classification via at least one classifier, the at least one classifier encompassing a neural network that includes at least one convolution layer.

\* \* \* \* \*